United States Patent [19]
Liljevik

[11] Patent Number: 5,476,360
[45] Date of Patent: Dec. 19, 1995

[54] METHOD FOR LOADING AND UNLOADING OF GOODS

[76] Inventor: Tord Liljevik, Box 291 38, S-100 52 Stockholm, Sweden

[21] Appl. No.: 211,687
[22] PCT Filed: Oct. 14, 1992
[86] PCT No.: PCT/SE92/00721
   § 371 Date: Jul. 5, 1994
   § 102(e) Date: Jul. 5, 1994
[87] PCT Pub. No.: WO93/08078
   PCT Pub. Date: Apr. 29, 1993

[30] Foreign Application Priority Data

Oct. 16, 1991 [SE] Sweden .................................. 9103012

[51] Int. Cl.⁶ .................................. B64F 1/32; B60P 1/02
[52] U.S. Cl. .......................... 414/786; 414/495; 414/347
[58] Field of Search .................................. 254/2 R, 2 C, 254/8 C; 414/508, 345, 347, 540, 501, 495, 796.7, 786

[56] References Cited

U.S. PATENT DOCUMENTS

| | | | |
|---|---|---|---|
| 2,797,833 | 7/1957 | Cash, Jr. | 414/495 |
| 3,073,388 | 2/1962 | Carter | 414/796.7 |
| 3,489,300 | 1/1970 | McCartney et al. | 414/347 X |
| 3,506,144 | 4/1970 | Carder et al. | 414/495 X |
| 3,520,427 | 7/1970 | Offen | 414/540 X |
| 3,524,563 | 8/1970 | McCartney et al. | 414/495 X |
| 3,666,127 | 5/1972 | Guyaux | 414/495 |
| 4,010,826 | 3/1977 | Jones | 414/495 |
| 4,701,097 | 10/1987 | Sturtz | 414/495 |
| 4,978,272 | 12/1990 | Leon | 414/495 X |

FOREIGN PATENT DOCUMENTS

| | | | |
|---|---|---|---|
| 0136970 | 4/1985 | European Pat. Off. | 414/495 |
| 2130968C2 | 7/1982 | Germany . | |
| 3523566A1 | 1/1986 | Germany . | |
| 3730415A1 | 4/1988 | Germany . | |
| 9308087 | 4/1993 | WIPO | 414/495 |

Primary Examiner—Michael S. Huppert
Assistant Examiner—Stephen Gordon
Attorney, Agent, or Firm—Larson & Taylor

[57] ABSTRACT

A method of loading goods into and unloading goods from narrow spaces located some distance above ground level is disclosed. In the method, use is made of a specially designed loading truck with a drive and steering apparatus which can be driven from one place to another and including a cargo lifting apparatus suited for lifting an entire transport carriage of cargo. The apparatus also includes a lift for vertically lifting persons adjacent to the cargo lifting apparatus to thereby provide free access to the load platform. In the method, the truck is driven to the location where the cargo is standing, the cargo is lifted by the truck, the truck is driven to a position adjacent to the unloading place, the transport carriage is lifted until the uppermost layer of cargo is level with the unloading place, and the person lifting device is lifted to a convenient position adjacent the cargo and luggage is unloaded.

1 Claim, 3 Drawing Sheets

METHOD FOR LOADING AND UNLOADING OF GOODS

FIELD OF THE INVENTION

The present invention generally relates to a method and and apparatus for loading and unloading of goods into and from narrow spaces, and the invention is more particularly concerned with loading and unloading of goods into and from highly located spaces, especially into and from spaces having a low ceiling height.

The invention has especially been made as a solution of the problem of loading and unloading of goods into and from cargo or luggage holds of air planes, and the invention will mainly be described in connection to such field of use. It is, however, obvious to the expert that the claimed method and apparatus are useful for many other purposes and within many other technical fields.

BACKGROUND OF THE INVENTION

Loading and unloading of cargo or luggage to and from air planes is a hard, stressful and crampy job. So far three persons have generally been involved in the work consisting of loading of cargo or luggage from a transport carriage standing on the ground to its final place in the cargo hold of the air plane, and unloading of the cargo or luggage from the cargo hold of the air plane to the transport carriage on the ground, respectively.

The loading has generally been made in that one person drags a carriage filled up with cargo or luggage to a position adjacent the air plane, a first loader man lifts and carries the luggage from the transport carriage to a conveyor belt extending from the ground to the luggage hold of the air plane, on which conveyor the luggage is transported as far as to the hold hatch of the air plane; a second loader man, who is sitting on his heels close to the opening of the narrow, often only 90 cm high hold, receives the luggage from the conveyor and throws it further into the hold; a third loader man, who is likewise sitting on his heels at the inner end of the hold receives the luggage (cargo) from the second loader, lifts the luggage, turns round together with the luggage and stows the luggage as deep in the hold as possible.

The job environment is very straining, especially for the second and the third loader persons. The loaders are sitting on their heels in the low, often only 90 cm high luggage hold, and they have to lift and carry the luggage, to rotate together with the luggage, and they have to throw or stow, respectively, the luggage which can be of the most various shapes and can have very varying weight. The loaders further work under great press of time, since it is many times depending on the loader persons if the air plane can keep its time schedules.

Also, the above mentioned first load attending person has a hard job involving, at least in some cases, to drag the transport carriage as far as to the load band conveyor, and also to lift and carry the luggage or cargo from the transport carriage to the conveyor. Especially in winters there can be skid accidents when the transport carriage, which is often very heavy, has to be dragged from the parking place as far as to the hold conveyor.

The object of the invention therefore is to solve the problem of providing a method and an apparatus for facilitating the job with loading of goods into and unloading of goods from highly located, narrow spaces like luggage or cargo holds of an air plane.

SUMMARY OF THE INVENTION

According to the invention there is made use of a specially designed loading truck formed with drive and steering means so that it can be driven from one place to another, a cargo lifting means suited for lifting of the entire transport carriage with the luggage or cargo, and a person's lift for making it possible to lift the driver a certain distance up and down respectively into a suitable position for handling, on any occasion, the uppermost layer of luggage on the transport carriage. In this case the driver of the truck is the same person as the above mentioned first loader man.

An important feature of the apparatus of the invention is that the person's lift and the load platform are formed without any uprights, so that there is a free access between the loading person on the person's lift platform and the load on the load platform. As a consequence the loading person does not need to make any lifting movement of the goods when moving said goods from the load platform to the floor of the air plane and vice versa. Firstly he adjusts himself to a correct height position in relation to the place of loading or unloading, secondly he adjusts the load platform to the correct height position. In standing position he only grabs the uppermost luggage which is in about the same height position as his own elbows, he rotates and puts the luggage down on the air plane floor which is likewise in about the same height position as his elbows—and vice versa.

It should be emphasized that the fork truck can not be used for this type of loading/unloading since a fork truck is generally always formed with one or more uprights along which the fork is raised and lowered while handling the goods. Such uprights are a significant obstacle to an optimum easy handling of the goods like with the presently claimed apparatus.

In executing the claimed method the truck is driven to the place where the transport carriage with the luggage or cargo is standing; the transport carriage is lifted by the lifting means of the truck; the truck with the luggage is driven to a suitable position adjacent the hatch of the air plane hold space; the hatch is opened; the transport carriage is lifted by the load lifting means until the uppermost layer of luggage is on level with the hold floor; the truck driver, which is the same person as the first loader, lifts himself, by means of the person's lifting device, to a suitable position for handling of the said uppermost layer of luggage; and standing up in this position he carries over the luggage to the sole needed loader or stevedore in the luggage hold. Unloading of the luggage is made in the opposite way.

The loading and unloading work is highly simplified by means of said method and apparatus both inside and outside the luggage hold; the driver/first loader is standing well sheltered from weather and wind; it is possible to provide a good work-light at the loading/unloading place on the luggage carriage; and there is no need for

- a special arrangement or a separate person for dragging the transport carriages with the luggage;
- there is no need for a belt conveyor which is often expensive;
- there is no need for a fork lift for heavy articles, i.e. goods with a weight over 150 kg;
- there is no need for a stool, a ladder or a similar device for reaching a position high enough for opening of the luggage hold hatch;
- it is possible to eliminate the need for one of the above mentioned previously needed three loader persons.

The same job which so far has to be made by three loaders now can be made substantially much simpler and in a substantially less labour consuming way than before, and now by only two persons.

The method and apparatus according to the present invention is useful for many different purposes and within many technical fields, not only for handling of goods to an from air planes as will be described more in detail in the following, but also as "pick-up trucks" for handling goods to and from shelves in warehouses, stores etc, since both the persons lift platform and the load platform are operated by means of any type of scissors lifts mounted underneath said platforms, and since there are consequently no uprights or any other means which prevent a free access for the handling persons between the persons lift and the the load platform.

Further characteristics and advantages of the invention will be evident from the following detailed specification in which reference will be made to the accompanying drawings.

DETAILED DESCRIPTION OF THE PREFERRED EMBODIMENTS

Figure 1:
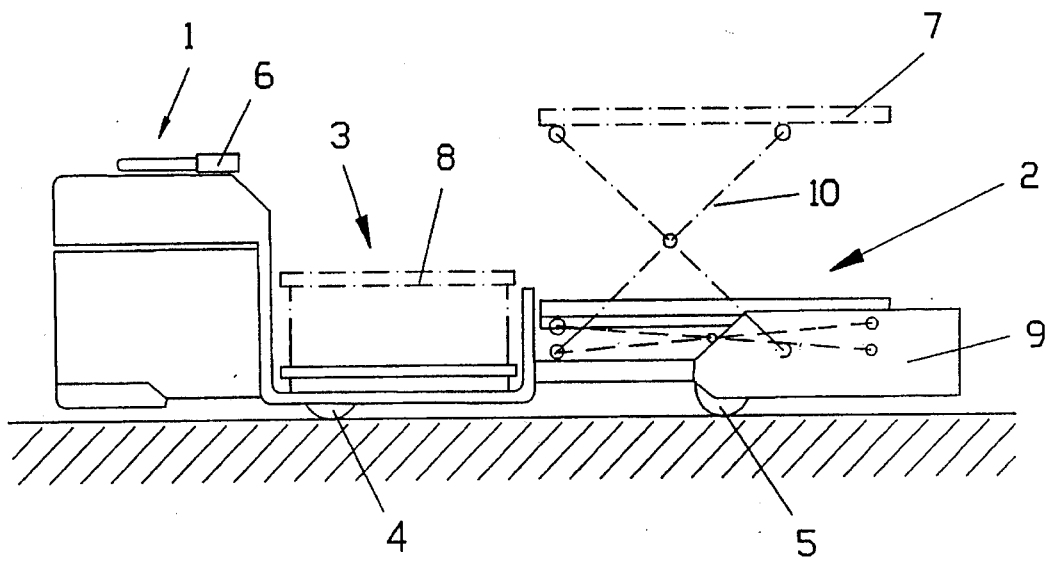
FIG. 1 shows a side view of a loading truck according to the invention.
Figure 2:
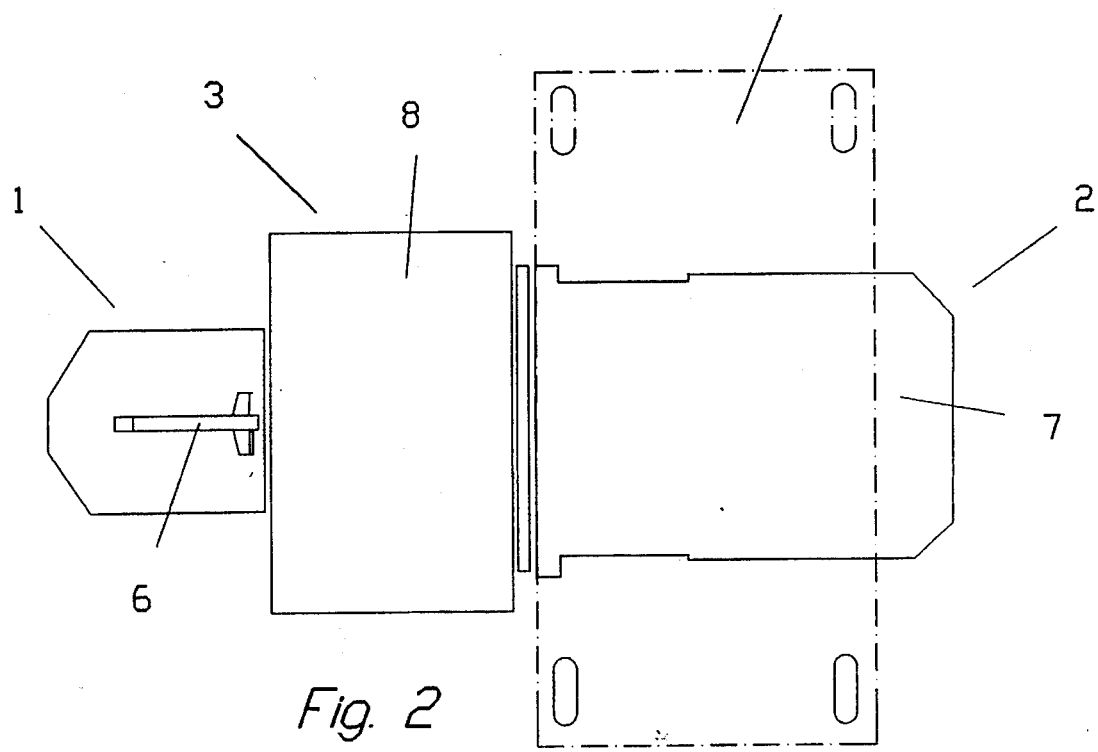
FIG. 2 is a top view of loading truck.
Figure 3:
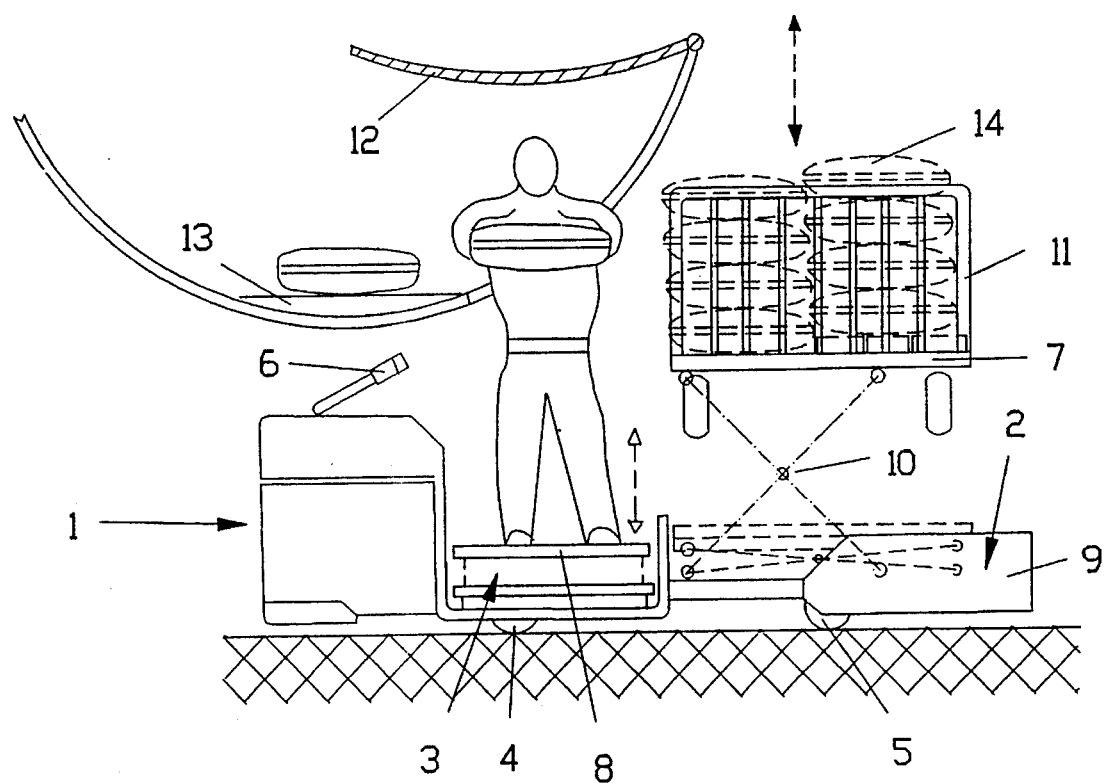
FIG. 3 diagrammatically illustrates how loading and unloading of luggage is made into and from an air plane hold respectively.

The loading truck shown in FIGS. 1–3 generally comprises three main parts, namely a drive unit 1, a load lift unit 2 and a person's lift 3. The person's lift 3 is mounted between the drive unit 1 and the load unit 2.

As conventional the truck is formed with four wheels, two drive wheels 4 of which are mounted under the person's lift 3 and two idle running wheels 5 of which are mounted adjacent the load lift end of the truck. As conventional the drive wheels 4 also act as steering wheels for the truck. The maneuvering is made by means of a steering arm 6 or any equivalent device, having means for controlling the drive speed, the braking and the forward/rearward driving. The drive unit also comprises (not illustrated) means for raising and lowering of the a load platform 7 of the load lift unit 2 on which the load (cargo) is carried, and means for raising and lowering of a platform 8 on which the truck driver, who is at the same time a loader man, is standing while driving the truck and loading and unloading the luggage.

The load lift unit 2 comprises a support 9 which is carried on the idle running wheels 5 and which carries the load platform 7 over a scissors lift unit 10 (articulated jack), in which one end of each scissors leg, as known, is only rotatable, whereas the other end, the shown outer end, of each scissors leg is slidable in a guide of the support 9 and at the bottom side of the load platform 7 respectively, so that the load platform 7 can be vertically displaced up and and down. In FIG. 1 the load platform 7 is shown in its bottom position with full lines and in its top position with broken lines. The load platform 7 can be stopped in any intermediate position between said end positions. It should be emphasized in this connection that fork trucks can not be used for the present actual purpose for the reason that the fork base on which the forks are raised and lowered hinder the handling of the goods on the load carriage. The illustrated sicissors lift unit, on the contrary, leaves completely free access to the loaded goods.

Similarly the person's lift platform 8 can be raised and lowered, and in FIG. 1 it is shown in its bottom position with full lines and in its top position with broken lines. The person's platform 8 is relativly wide, so that the driver/loader can move some distance towards one short end or the other of the load carriage.

FIG. 2 indicates how the load truck is used for collecting and handling of a goods carriage 11 which can be fully loaded with goods like luggage or cargo which is to be loaded into a air plane. This is done in that the load lift unit 2 is driven to a position in between the wheels of a luggage carriage 11, whereupon the load platform 7 is raised so as to lift the entire carriage together with the luggage from the ground.

Figure 4:
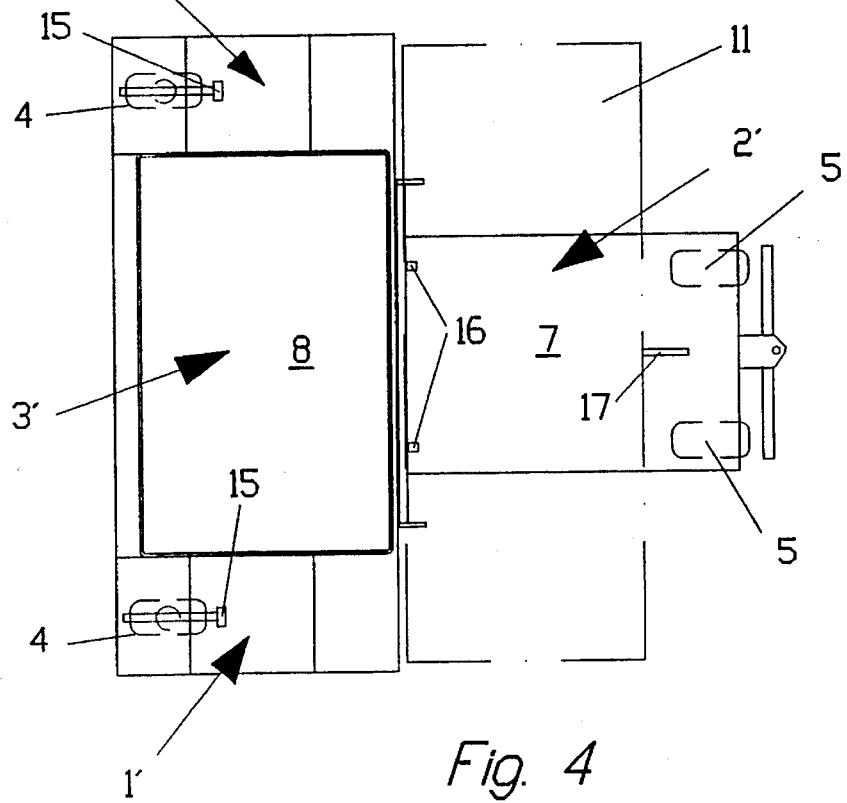
FIG. 4 is a top view of an alternative embodiment of a loading truck according to the invention.
Figure 5:
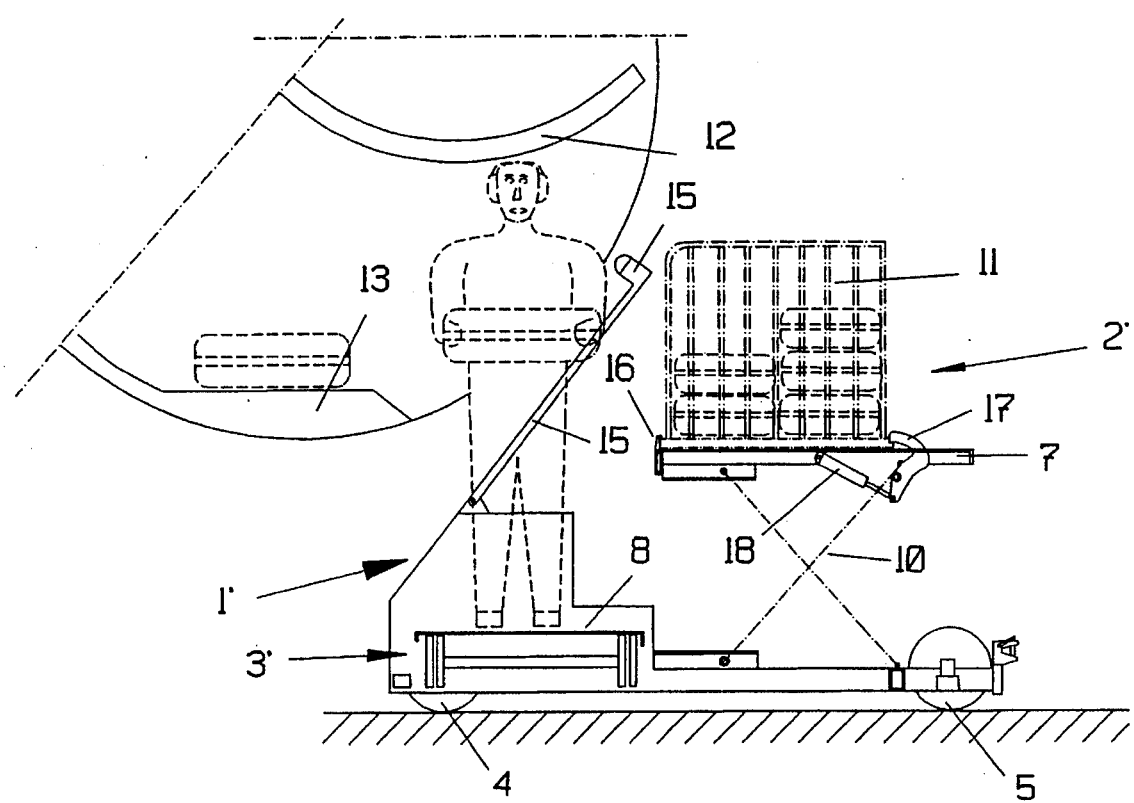
FIG. 5 is a front view of the same loading truck, and FIG. 6, which is a cross section along lines VI—VI of FIG. 4, illustrates, similarly as in FIG. 3, the method of loading into or unloading of luggage from an air plane hold.
Figure 6:
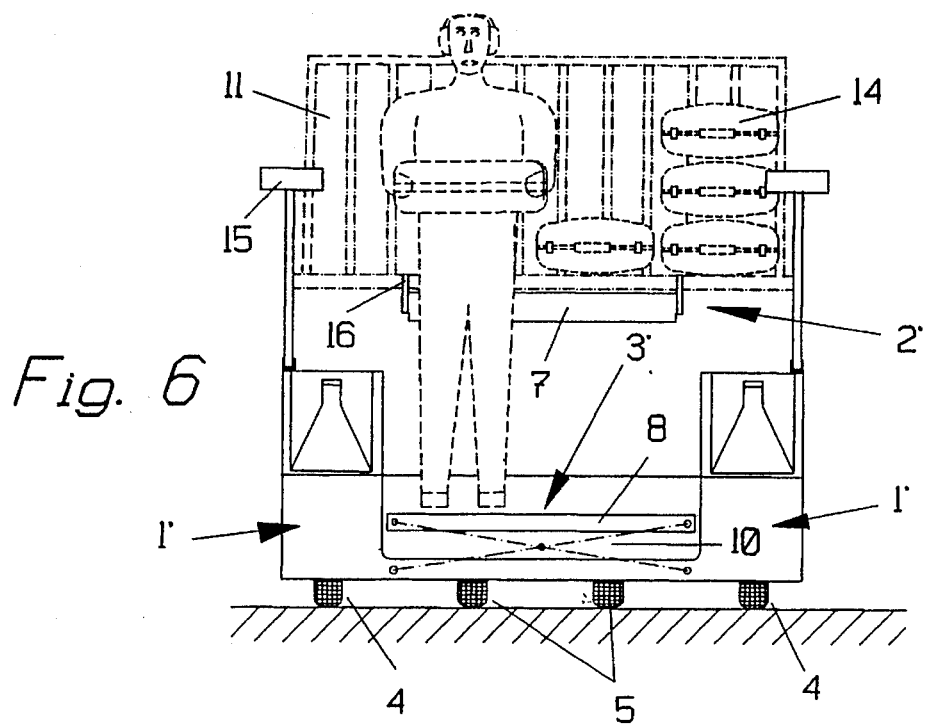

The embodiment of the invention illustrated in FIGS. 4–6 differs from that of FIGS. 1–3 mainly in that the drive and steering unit 1' is split into two, or eventually four, spaced drive unit parts mounted on each side of the person's platform 8. By this arrangement the load truck can be made substantially shorter in length than that of FIGS. 1–3 and it has an improved stability depending on the extended width thereof. Further, the load truck is formed with two upright stop bars 15, or a similar means, which are rotatably mounted on the drive unit parts and which are spring biassed towards their upright positions. The stop bars 15 are connected to the drive motors of the truck such that the drive motors are immediately stopped and the truck is immediately braked to stop as soon as said stop bars hit any object like the body of the air plane. It is also shown that the luggage carriage 11 is locked on the load platform 7 by means of an inner, fixed locking bracket 16 and by means of an outer, rotatable locking arm 17 which is operated to and from the locking position by means of a hydraulic motor 18. In its down position the locking arm 17 is located below the lever of the load platform 7 so as not to form an obstacle when picking up or setting down a load carriage 11. The truck may be operated for the drive forward/rearward and steered by means of a joy- stick-like operating pin, and a similar means may be provided for operating the load platform 7 and the person's lift platform 8.

Only two loaders are needed for any and all handling of the goods carriage 11 on the air plane. One loader places himself on the mobile person-and-load-carriage-lift-truck and drives the truck so that the load platform 7 enters a position under a loaded goods carriage. The load platform 7 is lifted by means of the scissors lift unit 10, so that the wheels of the load carriage 11 run free from the ground, and the truck with the load carriage is driven to a position adjacent the hold hatch of the air plane, see FIG. 3. The person's platform 8 is raised so that the loader enters a position making it possible to open the hatch 12. The hatch is opened, and the truck with the person's lift platform 8 is raised a further slight distance on so that the loader gets into a suitable working position in relation to the open hold hatch 12 and the floor plate 13 of the air plane. Further, upon need the height position of the person's platform 8 is adjusted so that the loader will be standing in the best possible loading (or unloading) position, and thereafter the height position of the load platform 7 is controlled so that the uppermost layer of 14 of luggage of she goods carriage 11 enters a suitable position for being lifted and carried off the load carriage and for being laid down in the air plane.

The second loader crawls, as usual, as far as to the end of the hold space whereby he is in position for receiving and for stowing the luggage which is forwarded by the first loader. incidentally, said second loader may use the person's platform 8 as a step for entering the hold space of the air plane.

The first loader, who can now work standing in an upright position, now simply and ergonomically can lift the goods 14 from the load carriage and pass it into the hold of the air plane without the need of rotating his body. The person's lift platform 8 is so wide that the loader can move along the load carriage in order to get into a better position for picking up and passing the luggage or any other type of goods into the air plane hold. As the goods 14 is lifted off the goods carriage 11 the load platform 7 is raised so that, at any moment, the uppermost pieces of goods 14 on the load carriage 11 are always located in a suitable height position for the loader.

In combination with the above described load truck it is also possible to make use of a belt conveyor of the type called "sliding carpet", which is in such case mounted in the hold and which moves the goods as far into the hold as desired, whereby the work environment also for the "second" loader is being improved.

The unloading of the goods is made in the opposite way as described above. The truck driver, which is also the first loader, gets an empty goods carriage 11 and drives the truck with said goods carriage 11 as far as to the air plane, he opens the hold hatch 12, he raises the person's lift platform 8 to a suitable working position for the first loader, he raises the load platform 7 to a suitable position for laying down the goods 14 thereon and, upon need, he lowers, step by step, the load platform 7, and finally he drives off the filled load carriage and puts it down at any desired place.

Reference numerals:
1 drive unit
2 load lift unit
3 person's lift
4 drive wheel
5 idle running wheel
6 steering arm
7 load platform
8 person's lift platform
9 support (for 2)
10 scissors lift unit
11 goods carriage
12 hatch (of the hold)
13 floor plate
14 uppermost layer
15 stop bar
16 lock bracket
17 locking arm
18 hydraulic motor

I claim:
1. Method of loading goods into and unloading goods from a hold of an airplane located at least some distance above the ground level, while using a specially designed load truck including a drive means and steering means (1) so that the truck can be driven from one place to another, a load lift means (2) having a load platform (7) suited for lifting a complete load unit comprising a goods transport carriage (11) together with goods (14) loaded thereon, and a person's lift platform (8) capable of lifting a person a predetermined distance up and down respectively into and from a suitable position for handling of goods lying on a floor (13) of the hold and lifting an uppermost layer of a luggage unit on the goods transport carriage (11) respectively, and formed so that the person can move himself standing on the person's lift platform into a position right in front of a hold opening, whereby the loading and unloading is made in the same way but in inverse order, comprising the steps of:

driving the truck to a place where the goods transport carriage (11) with goods (14) is standing;

lowering the load lift means (2) and positioning said lift means at a position underneath the goods transport carriage (11);

raising the load lift means (2) so that the goods transport carriage (11) is lifted free of the ground;

driving the truck with the goods transport carriage (11) to a suitable position adjacent a loading/unloading place, and so that the person's lift platform is in position in front of a hold opening;

raising the person's lift platform (8) independently of the load platform so that the person is positioned at a suitably high working unloading position in relation to the hold;

raising the load platform (7) independently of the person's lift platform so that an uppermost layer of goods (14) is positioned at a suitable unloading/loading position for the person;

unloading the goods (14) by successively lifting off the uppermost layer of goods on the goods transport carriage;

raising the load platform (7) intermittently during unloading of the goods so that an uppermost layer of goods (14), at any moment, is always in a suitable loading/unloading position; and after the unloading of goods (14) from the goods transport carriage (11), or the loading of goods (14) from the hold to the goods transport carriage (11), is finished, lowering the person's lift platform (8) and the load platform (7) and moving the truck together with the goods transport carriage (11) away from the loading/unloading place.

* * * * *